Figure 1:
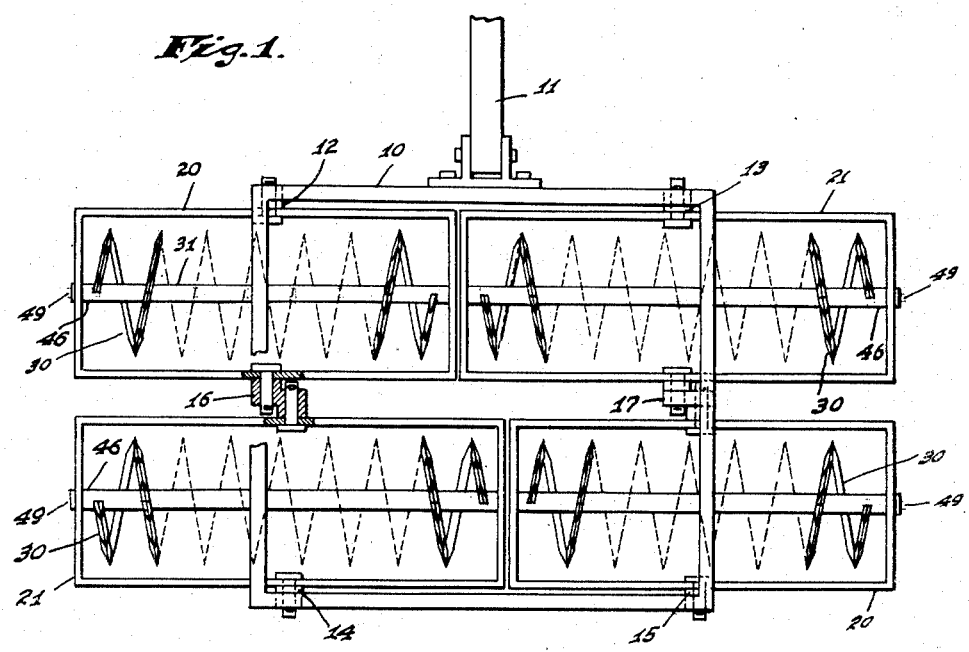

Sept. 1, 1953  G. A. NEWHOUSE  2,650,460
SPIRALLY ARRANGED TOOTHED CULTIVATOR WHEEL
Filed May 14, 1948  2 Sheets-Sheet 1

INVENTOR.
GEORGE A. NEWHOUSE,
BY
ATTORNEYS.

Sept. 1, 1953   G. A. NEWHOUSE   2,650,460
SPIRALLY ARRANGED TOOTHED CULTIVATOR WHEEL
Filed May 14, 1948   2 Sheets-Sheet 2
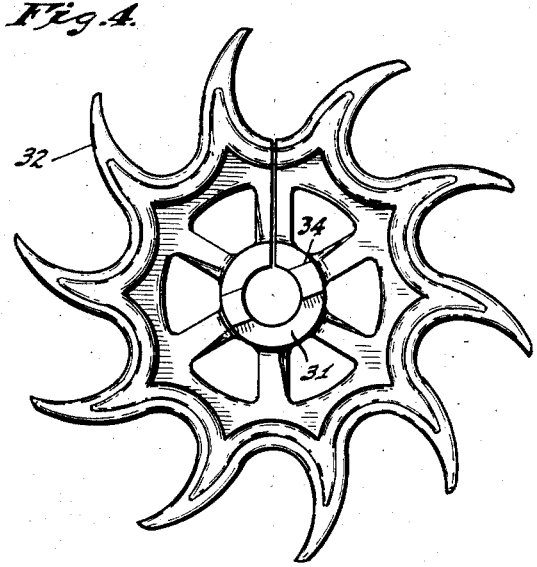
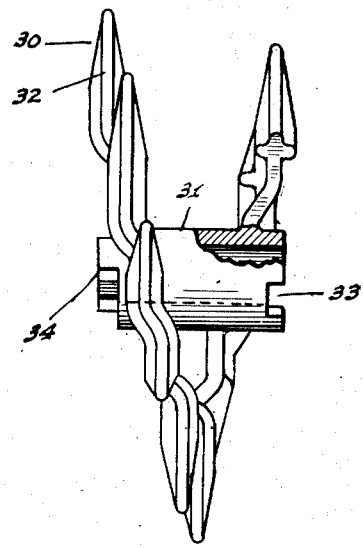
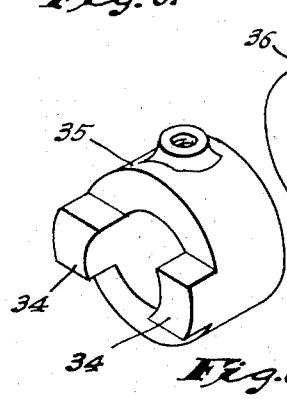
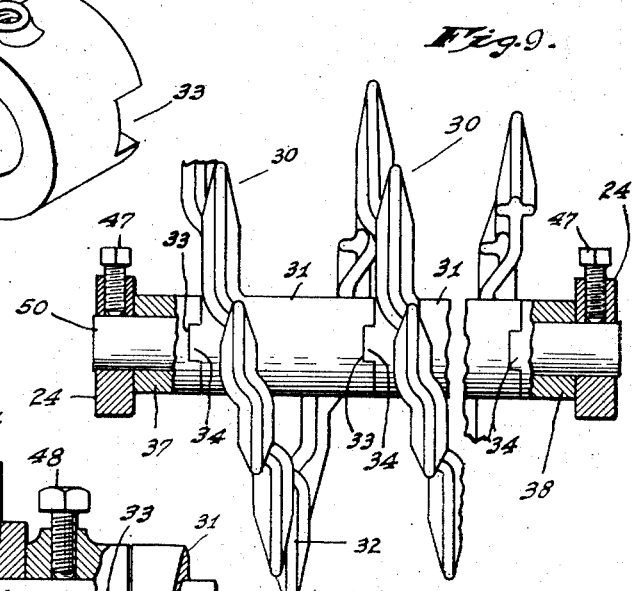
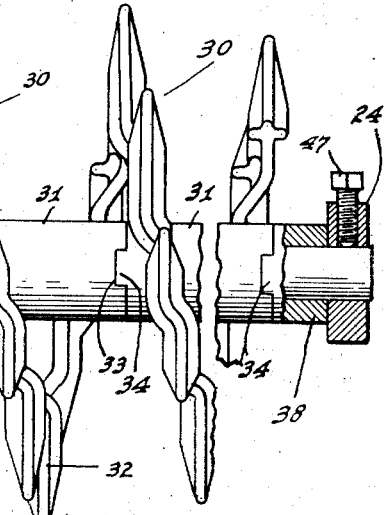
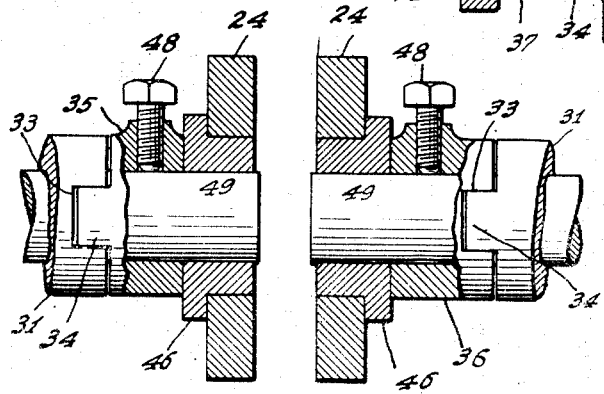
INVENTOR.
GEORGE A. NEWHOUSE,
BY
ATTORNEYS.

Patented Sept. 1, 1953

2,650,460

UNITED STATES PATENT OFFICE 2,650,460

SPIRALLY ARRANGED TOOTHED CULTIVATOR WHEEL

George A. Newhouse, Yorktown, Ind., assignor to Norman G. Gilbert, Muncie, Ind., as trustee Application May 14, 1948, Serial No. 26,971

1 Claim. (Cl. 55—152)

This invention relates to a rotary hoe cultivator.

It is an object of my invention to provide an improved agricultural implement which will effectively cultivate the soil, with a hoeing action that will produce thorough mulching of the soil and will condition the soil to a considerable depth and will be highly effective in a single pass of the implement over the ground. It is a further object of my invention to provide such an implement which will thus effectively cultivate the soil without the necessity for great weight, which will effectively remove vine-like growth and avoid entanglement of the vines in the implement, and which implement will be readily adapted to the various phases of cultivation encountered at different seasons and for different kinds of crops and under different climatic conditions. It is a further object of my invention to provide such an implement in which rotatable hoe elements are positioned with their successive points spaced both circumferentially and radially from adjacent points, so that they lie in a helix; and in which the hoe elements are arranged in two tandem rows, with each row flexible from end to end; and to provide an implement which will cultivate the entire area of the ground over which the implement is moving. It is a further object of my invention to provide such an implement which is of simple and inexpensive construction and will require a minimum of upkeep, and which is durable and dependable in operation.

In carrying out my invention, I form the several helically related hoe elements on a series of sections each of which preferably includes the hoe elements of a single turn of the helix, and which sections fit together axially on a common shaft to form a continuous spiral of hoe elements. I divide each row of hoe-element sections preferably in two groups, with each group of sections carried by its own sub-frame; and I pivotally mount the sub-frames transversely in end-to-end relationship and on pivotal axes which extend in the direction of travel, so that each group of spiral sections is free to pivot laterally to conform to the contour of the ground surface. Desirably, the interruption of continuity in each row of hoe-elements is made relatively short, desirably not greater than the distance between adjacent turns of the spiral, and I position the interruptions in the two tandem rows out of alinement, preferably by offsetting the interruptions in opposite directions from the center line of the implement, so that the ground which is missed by one spiral is cultivated by the other.

Figure 2:
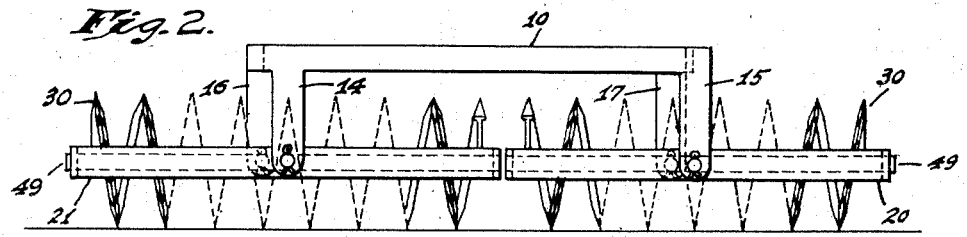
Figure 3:
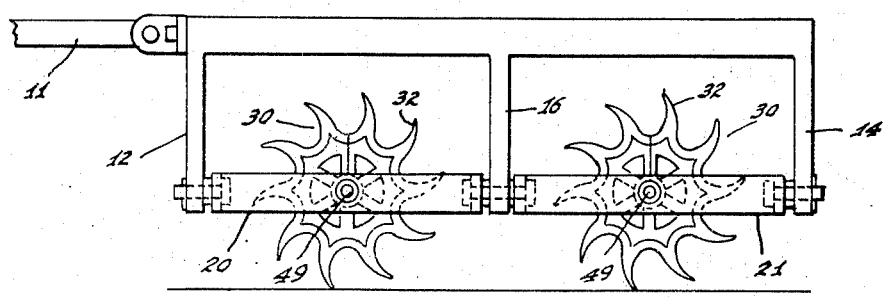

The accompanying drawings illustrate my invention: In such drawings, Fig. 1 is a plan of an implement embodying my invention; Fig. 2 is a rear elevation of the implement shown in Fig. 1; Fig. 3 is a side elevation of the implement shown in Fig. 1; Fig. 4 is a side elevation of one of the hoe-element sections used in the implement of Fig. 1; Fig. 5 is an end elevation of the section shown in Fig. 4; Figs. 6 and 7 respectively are perspective views of end spacers used at the ends of a series of the hoe elements shown in Figs. 4 and 5; Fig. 8 is a fragmental axial section showing a preferred form of bearing assembly for a row of hoe-element sections, in which the several sections are locked on a rotary shaft; and Fig. 9 is an axial section showing a modified mounting arrangement, in which the sections rotate on a fixed shaft.

The implement shown in the drawing comprises a main frame 10 of generally rectangular plan, provided with a tongue 11 pivotally connected at its front end, and with a downwardly extending sub-frame support at each corner and at the middle of each longitudinal side. The sub-frame supports 12 and 13 at the front corners of the frame 10 and the supports 14 and 15 at the back corners of the frame may each be provided with a single pivot hole at each lower end, while the sub-frame supports 16 and 17 intermediate the longitudinal sides of the main frame 10 are desirably provided with two laterally spaced pivot holes. The pivot hole of the support 12 is alined with the outer pivot hole of the support 16 and such two alined holes support the pivots for the sub-frame 20 of the forward left-hand group of the hoe-element sections 30. Desirably, such pivots are at the mid-point of the sub-frame 20, for equalization. The front, right-hand subframe 21 is larger than the sub-frame 20, conveniently by the length of one hoe-element section 30. It is likewise pivoted at the middle, and to this end the pivot hole of the support 13 is alined with the inner pivot hole of the support 17. A sub-frame 20, conveniently identical with that at the forward left-hand corner of the main frame 10, is positioned at the rear right-hand corner of the main frame 10, and is pivoted to the outer pivot hole of the support 17 and to the alined pivot hole in the support 15. A sub-frame 21, identical with that at the forward right-hand corner of the main frame 10, is positioned at the rear left-hand corner of the main frame 10, and is pivoted to the inner pivot hole of the support 16 and to the alined pivot hole in the support 14.

Each sub-frame 20 and 21 carries a series of hoe element sections 30 mounted for rotation on an axis transverse of the implement, and the sections of each series form a continuous spiral of hoe elements extending the full length of the series. Desirably, the adjacent ends of each pair of sub-frames 20 and 21 are of a construction which takes up an amount of space axially of the hoe-element sections 30 less than the pitch distance between adjacent flights of the spiral of hoe elements.

With this arrangement, the break in the continuity between the two series of elements 30 carried respectively by the forward sub-frames 20 and 21, is of a minimum size, not greater than the pitch distance, and is offset to the left from the center line of the implement; and the corresponding break in the rear set of elements 30 is likewise of minimum size and is offset to the right; and the ground area missed by the break in the forward row of hoe elements is cultivated by the overlapping portion of the rearward row of hoe elements, and vice versa.

Each hoe section 30 is desirably formed as a single casting, such as that shown in Figs. 4 and 5, with a central hub 31 and a series of peripheral hoe elements 32. The several hoe elements 32 lie in planes perpendicular to the axis of the hub 31, but are successively offset so that their points lie in a helical path. Preferably, the length of the hub 31 and the number and spacing of the hoe elements 32 is such that the hoe elements 32 of each section 30 form a single complete turn or flight of the spiral, with end faces at opposite ends of the flight lying substantially in a common axial plane. One end of each hub 31 is provided with notches 33 and the other end is provided with lugs 34 adapted to fit the notches 33 of the adjacent section 31. When the sections are assembled on a common shaft in end to end relationship, the notches and lugs of their hubs 31 will interlock, and the end-faces of the flights of adjacent sections will come together in face-to-face position, so that the flights of the successive sections will form a continuous spiral of hoe elements extending the full length of the section assembly.

Each group of sections is preferably mounted on a shaft 49 journaled in bearings 46 in the end members 23 and 24 of the sub-frame, as shown in Fig. 8. To this end, collars 35 and 36, respectively provided with lugs 34 and notches 33, are placed at the opposite ends of the series of sections in engagement with the notches and lugs at the ends of the series of sections 30; and set-screws 48 in such collars are tightened to lock the collars on the shaft. Such collars hold the series of sections 30 in assembly and fixed to the shaft, and the outer ends of the collars desirably form thrust bearings against the inner ends of the bearings 46.

Alternatively, each group of sections 30 may be mounted for rotation on a fixed shaft, as shown in Fig. 9. In this case, spacing collars 37 and 38 are placed at the ends of the series of sections 30, on a shaft 50, and such shaft is fixed in the end members 23 and 24 of the sub-frame, as by means of set-screws 47. The several sections 30 of the series will be locked together by interengagement of the lugs 34 and the notches 33 on adjacent sections, and the whole series of sections will rotate on the common shaft 50.

The several hoe-element sections 30 of the implement are conveniently made as simple castings, and require a minimum, if any, of finishing operations, for such operations will at the most involve merely smoothing the bore of each casting and removing the fins and sprues which may be formed as an incident of the casting operation.

The several sections 30 of the implement may all be identical, in which case the spirals formed by the hoe elements 32 of each sub-assembly in the sub-frames 20 and 21 will all be identical and of the same pitch. Preferably, however, and as shown in Fig. 1, I make the sections 30 to provide a right hand pitch in one of the sub-frames 20 or 21, and a left hand pitch in the other of such sub-frames 20 and 21. For example, as shown in Fig. 1, the sub-frame 21 at the front right corner of the implement contains sections 30 of the right-hand pitch, the other front sub-frame 20 contains sections 30 of left-hand pitch, the rear left sub-frame 21 contains sections of right-hand pitch, and the right rear sub-frame contains sections of the left-hand pitch.

My invention contemplates that the groups of sections 31 contained in the sub-frames 20 and 21 may be supported by other frame-work, and that a greater number of rows of such sub-groups may be embodied in a single implement. I find, however, that two rows of such sub-groups is effective, and I prefer that arrangement.

In use, the cultivator is drawn forward over the area to be cultivated. As it moves, the hoe elements 32 penetrate the soil as they move downward in their paths of rotation, and then turn rearward and rise out of the soil. The front row of hoe-elements effects this cultivating action over its whole length, save for the short gap between its two series of hoe-element sections. The rear row of hoe elements effects a similar action, and cultivates that part of the soil area missed by the gap in the front row. The independent support of the two series of hoe element sections of each row permits each group of hoe elements to pivot independently and provides transverse flexing of both rows of hoes, to effectively cultivate the soil over the whole width of the implement regardless of any unevenness of the ground surface. In addition, the main frame is free to tilt longitudinally, to keep both rows of hoes in cultivating engagement with the ground surface.

The implement provides uniform and effective cultivation, under widely varying soil and climatic conditions. It is especially advantageous for the mulching effect which it produces, and for its effectiveness in overcoming growth of noxious vines.

I claim as my invention:

In a cultivator having interconnected carrier means for a plurality of groups of cultivator elements arranged in transversely offset relation and having a supporting shaft for each group of elements, the improvement comprising, in combination, hoe element sections each consisting of an integral casting having a hub, supporting structure extending radially from said hub, a plurality of outwardly-projecting, forwardly-curved, tapering hoe elements carried by said supporting structure and equally spaced circumferentially about said hub, the bases of said hoe elements being thickened and interconnected to form a rim-portion at the periphery of said supporting structure, said supporting structure and rim-portion and hoe elements lying in a helix about the hub, forming a single helix-flight thereabout, and terminating circumferentially in non-overlapping relation substantially at an axial radial plane, complementary interengaging axially-opening means at opposite ends of the hub to prevent relative rotation of axially interengaging sections, the length of the hub and axial spacing of said means at its ends being effectively equal to the pitch of said helix, a plurality of said hoe-element sections being assembled in interengaged relation coaxially on a supporting shaft and forming a continuous multiple-helical-flight, rim portion and series of hoe elements thereabout, and means to hold said sections in interengaged relation on the shaft for rotation as a unit on the axis of the shaft.

GEORGE A. NEWHOUSE.

References Cited in the file of this patent

UNITED STATES PATENTS

| Number | Name | Date |
|---|---|---|
| 352,956 | Newsom | Nov. 23, 1886 |
| 418,106 | Boyer | Dec. 24, 1889 |
| 591,414 | Middleton et al. | Oct. 12, 1897 |
| 795,421 | Swarts | July 25, 1905 |
| 1,018,605 | Carley et al. | Feb. 27, 1912 |
| 1,062,617 | Stryker | May 27, 1913 |
| 1,363,444 | Van Den Heuvel | Dec. 28, 1920 |
| 1,496,242 | Matz | June 3, 1924 |
| 1,844,255 | Kaupke | Feb. 9, 1932 |
| 2,192,877 | Winsor et al. | Mar. 12, 1940 |
| 2,468,776 | Patterson | May 3, 1949 |